US012099638B2

(12) United States Patent
Bildhaiya et al.

(10) Patent No.: US 12,099,638 B2
(45) Date of Patent: Sep. 24, 2024

(54) SECURITY DEVICE WITH EXTENDED RELIABILITY

(71) Applicant: Infineon Technologies AG, Neubiberg (DE)

(72) Inventors: Avni Bildhaiya, Deisenhofen Bei Munchen (DE); Viola Rieger, Munich (DE); Frank Hellwig, Wunstorf (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 630 days.

(21) Appl. No.: 17/403,075

(22) Filed: Aug. 16, 2021

(65) Prior Publication Data

US 2021/0374290 A1 Dec. 2, 2021

Related U.S. Application Data

(62) Division of application No. 16/108,505, filed on Aug. 22, 2018, now Pat. No. 11,227,072.

(30) Foreign Application Priority Data

Aug. 24, 2017 (DE) .................... 10 2017 119 417.7
Aug. 21, 2018 (DE) .................... 10 2018 120 328.4

(51) Int. Cl.
*G06F 21/74* (2013.01)
*G06F 21/50* (2013.01)
(Continued)

(52) U.S. Cl.
CPC .............. *G06F 21/74* (2013.01); *G06F 21/50* (2013.01); *G06F 21/554* (2013.01); *G06F 21/62* (2013.01); *G07C 5/0808* (2013.01)

(58) Field of Classification Search
CPC ........ G06F 21/74; G06F 21/50; G06F 21/554; G06F 21/62; G07C 5/0808
See application file for complete search history.

(56) References Cited

U.S. PATENT DOCUMENTS 11,227,072 B2 1/2022 Bildhaiya et al.
2013/0238945 A1* 9/2013 Vilela ................. G06F 11/1654
714/49
(Continued)

OTHER PUBLICATIONS

Boehm et al., "Ralf: Aurix™ Dedicated for Automated Driving and Electromobility," Embedded World, Nurnberg, 2017, pp. 1-16.
(Continued)

*Primary Examiner* — Ayoub Alata
(74) *Attorney, Agent, or Firm* — Harrity & Harrity, LLP

(57) ABSTRACT

A security hardware device is configured to secure a control apparatus. The security hardware device includes a data security domain; a functional safety domain; a data security processor provided in the data security domain and is configured to secure data from unauthorized access or manipulation; a functional safety processor provided in the functional safety domain and is configured to detect functional errors and generate respective safety alerts in response to detecting the functional errors; and a monitoring processor configured to analyze the respective safety alerts provided by the functional safety processor for at least one pattern of safety alerts indicative of a security attack and generate a response signal in response to the respective safety alerts having at least one of the at least one pattern of safety alerts.

21 Claims, 4 Drawing Sheets

(51) Int. Cl.
  *G06F 21/55*   (2013.01)
  *G06F 21/62*   (2013.01)
  *G07C 5/08*    (2006.01)

(56) References Cited

U.S. PATENT DOCUMENTS

| | | | |
|---|---|---|---|
| 2014/0013150 A1* | 1/2014 | Kaltenegger | G06F 11/0739 713/500 |
| 2014/0122942 A1* | 5/2014 | Vilela | G06F 11/0793 714/48 |
| 2015/0019919 A1* | 1/2015 | Kidamura | G06F 11/1612 714/56 |

OTHER PUBLICATIONS

Infineon Technologies AG: 32-bit Microcontrollers for Automotive and Industrial Applications, TriCore ™ for Safety applications; Neubiberg, https://www.infineon.com/dgdl/TriCore Family BR-2014.pdf? fileId=db3a30434486a89301448874070100b9[retrieved on Aug. 6, 2018], Feb. 2014, pp. 31-39.

Stumpf et al., "A Security Architecture for Multipurpose Ecus in Vehicles," In 25th Joint VDI/VW Automotive Security Conference, Ingolstadt, Germany, https://www.evita-projecl.org/Publications/SMWW09.pdf [retrieved on Aug. 6, 2018], Oct. 2009, pp. 1-22.

Boehm, Thomas and Koedel, Ralf. "Aurix™ dedicated for automated driving and electromobility." Embedded World, Nuremberg. Mar. 14-16, 2017. pp. 1-17.

Infineon Technologies AG. "Highly Integrated and Performance Optimized 32-bit Microcontrollers for Automotive and Industrial Applications." Neubiberg. Feb. 2014. pp. 31-39. https://www.infineon.com/dgdl/TriCore_Family_BR2014.pdf?fileld=db3a30434486a89301448874070100b9.

Marko Wolf and Timo Gendrullis. "Design, implementation, and evaluation of a vehicular hardware security module." In 14th International Conference on Information Security and Cryptology. Seoul, South Korea. Nov./Dec. 2011, pp. 1-17.

Stumpf, Frederic et al. "A security architecture for multipurpose ECUs in vehicles" In 25th Joint VDI/VW Automotive Security Conference. Ingolstadt, Germany. Oct. 2009. pp. 1-20.

\* cited by examiner

SECURITY DEVICE WITH EXTENDED RELIABILITY

CROSS-REFERENCE TO RELATED APPLICATIONS

This application is a divisional of U.S. patent application Ser. No. 16/108,505 filed Aug. 22, 2018, which claims the benefit of German Patent Application No. 10 2017 119 417.7 filed Aug. 24, 2017 and German Patent Application No. 10 2018 120 328.4 filed on Aug. 21, 2018, which are incorporated by reference as if fully set forth.

FIELD

The present disclosure relates to a security device, a system and a method for operating a security device of a control apparatus, preferably of a control apparatus of a vehicle. In particular, the present disclosure relates to a security device for securing data

BACKGROUND

Data security plays an increasingly important part in a variety of activities in daily life. In recent years, the influence and extent of social media, and also the steadily increasing digital connectivity between different terminal devices and/or users have resulted in users attaching great value to the availability of data and applications, and requirements have increased accordingly.

At the same time, storage of personal digital data and communication between different terminal devices or units require increased security, in particular for sensitive or confidential data. In the automotive sector and in the automobile industry, connectivity has increased in recent years, so that users can not only store, use and transfer navigation files and GPS positions, but also have contact data, telephone numbers and multimedia files and can retrieve and exchange personal interests and preferences via social media applications. Consequently, it is desirable to minimize a possible attack surface for third parties or external units in order to reduce the risk of cyber-attacks or DoS attacks.

A distinction is generally made between functional safety and data security. Functional safety essentially relates to technical core components which are required for the normal operation of a device, for example a power steering of the vehicle. Whereas a multiplicity of facilities are known for monitoring functional safety, data security facilities and the securing of functional capability, particularly in the automobile industry, are available to a limited extent only. Data security involves not only spontaneous bit flips, but normally also attacks, such as cyber-attacks. Since data security has hitherto barely played a part in the automobile industry, data security methods have been developed to a limited extent only, so that, today, data are only processed centrally in the data security domain of a microcontroller.

One problem here is that, although the data are retrievable in normal operation, the security domain is not available in an energy-saving mode or in emergency power operation. However, a further design of the data security domain offers no desirable solution, especially as this simultaneously results in an increased attack surface. The communication of data externally is essentially to be prevented.

Furthermore, in the case of a restart, the data security domain is not capable of detecting fault events. This means that there is no facility for checking whether a specific function is or is not available as desired. Consequently, a permanent error can result in all data security being absent or in the control unit malfunctioning due to the permanent error. A malfunction is unacceptable in the case of essential functions, such as e.g. a power steering.

SUMMARY

On the basis of the known prior art, one object of the present invention is to provide an improved security device for operating a control apparatus, and a corresponding system and method.

The object is achieved by a security device, a system and a method for securing a control apparatus as claimed in the independent claims Advantageous developments can be found in the subclaims and in the present description and figures.

A security device is proposed accordingly for securing a control apparatus. The security device includes a first security unit, data security unit, which is configured to secure data, data communication and information and includes a first security component inside the first security unit to operate in a first operating mode, and at least one first monitoring unit to operate in a high-availability mode, wherein the first monitoring unit is configured to detect a fault present in the first security component. The high-availability mode is different from the first operating mode.

It can furthermore be provided that the first security unit includes a second security component, wherein the first monitoring unit is arranged in the second security component and has a communication connection to the latter. The second security component is configured to output a first response signal if a fault is detected by the first monitoring unit, wherein the high-availability mode is available independently from the first operating mode.

Since the first monitoring unit is arranged in the second security component, the second security component forms a unit which is autonomous and independent from the first security component. The second security component can thus monitor the first security component or a status of the first security component and can detect the occurrence of a fault present only in the first security component. The integrity of the security device and therefore the control apparatus can furthermore be preserved through the output of a corresponding response signal when a fault is detected. The response signal may, for example, indicate to a user of the system that a fault is present which affects the security of data and information. The independent design of the second security component with the monitoring unit furthermore offers the advantage that said monitoring unit is not permanently connected to a unit arranged outside the second security component, so that, for example, stored or available data cannot be randomly retrieved from outside and are secured and the vulnerability of the security unit to attack is consequently reduced.

The second security component preferably has its own separate voltage supply. If a fault is detected in the first security component, it is thus ensured that the second security component can continue to detect and process faults and accordingly is not deactivated or is not operational in an energy-saving mode.

The control apparatus can be designed as a Micro Controller Unit (MCU). The control apparatus is preferably a control apparatus of a vehicle. Consequently, the control apparatus or MCU can also be designed as a node in a communication network in the automotive sector.

The security faults may affect a multiplicity of security functions and may relate to both hardware and software components. Hardware faults, for example, in accelerators, security storage media, in a hardware-supported intrusion detection system, in a secured clock generator, in secured fault event processing, in secured fault clearance or debugging, and in secured testing, etc., can be detected. Software faults, for example in a secured operating system, in secured software, in intrusion detection software, etc., can similarly be detected.

The security device may furthermore include at least one second monitoring unit to detect a fault present in the second security component. The second monitoring unit is arranged in the first security component and has a communication connection to the first security component, wherein the first security component is configured to output a second response signal if a fault is detected by the second monitoring unit. The first security component and the second security component can be configured in each case to transmit the respectively allocated response signal to a unit outside the first security unit.

The monitoring of the security component is thus mirrored with the second monitoring unit, so that a corresponding response signal can be output by the first security component if a fault also occurs in the second security component, for example in order to indicate to a user that the monitoring of the first security component is possibly defective or is not totally guaranteed. In other words, the security components can thus monitor one another, for example by way of "keep-alive" monitoring or through corresponding implementation as a watchdog in order to monitor the correctness of the required and/or specified functionality. The mirroring of the monitoring function thus offers the advantage, inter alia, that the security function of the security device is more reliable and availability is simultaneously increased.

The respective security components are preferably configured to transmit the response signal to a unit outside the control apparatus, wherein the transmission of the response signal preferably includes the transfer of data. The transmission can furthermore be performed via a pad or pin, preferably a defined and/or dedicated pad or pin in a different voltage domain. As a result, in answer or in response to internal events or communication in the respective security component, the security components can communicate with a unit outside the control apparatus, for example with a receiver or transmitter of the control apparatus or MCU. The communication facility for the respective security component by means of a pad or pin is preferably provided in different operating modes of the security unit, for example in both normal operation and high-availability operation of the security unit. This offers the advantage, inter alia, that the security unit can always communicate with an external unit if a fault is present or detected, so that, for example, a user is alerted or informed at all times, and the first security unit can process security events whenever a security fault occurs. The reliability and monitoring of the security device are thus further increased.

The data to be transmitted can furthermore be encrypted. For this purpose, a respective encryption unit arranged in the control apparatus and inside or outside the security components can furthermore be provided in the security device for the security components to encrypt the data. An encryption unit can be arranged, for example, inside the security component in order to increase the independence of the security component and reduce the vulnerability of the encryption to attack from external units. The communication security and data security between the second security component and a unit arranged outside the second security component is thus further improved.

The security components preferably form the core security components. The security components can be designed symmetrically or asymmetrically in relation to their respectively provided functionality, wherein the security components are furthermore preferably configurable. The first and second security component can be designed, for example, as totally symmetrical to one another so that they form a redundancy block. In this case, the security components are preferably arranged in the same voltage domain, in the same clock domain and close to one another in the same floor planning, so that short connection paths and signal paths are provided. This offers the advantage, inter alia, that, in the event of a failure or in the event of a detected fault in the first security component, the functions of the first security component can be taken over completely by the second security component and a user is thus not hindered by the fault.

However, the security components can also be designed asymmetrically, wherein the second security component can, for example, perform fewer functions compared with the first security component, but the main functions can be performed by the second security component in the event of a failure or in the event of a detected fault in the first security component. The respective functions in the first and second security component are preferably configurable so that the user can decide and specify which security functions must be present in which security component and, if necessary, in a corresponding operating mode.

Alternatively or additionally, an arrangement, a clock domain and/or a voltage domain of the security components can in each case be separated from one another. In other words, the first and second security component can be arranged inside the control apparatus, a clock domain of the first security component can be different from a second clock domain of the second security component, and/or a voltage domain of the first security component can be separated from a further voltage domain of the second security component. This furthermore increases the independence of the security components so that, if a fault is present in one of the security components, the functional capability of the other security component is not impaired by it and a response signal can thus be output independently from the functional capability of the defective security component.

If a fault is detected in the first security component, the second security component is preferably configured to provide at least a selection of a functionality of the first security component in the second operating mode of the second security component.

It is thereby enabled, in fault-free operation or in an operation in which an existing fault is negligible, the security unit can perform or provide all available functions, whereas, if a fault is detected, the security unit is operated in a high-availability mode, wherein the second security component takes over security functions. The first security component is then no longer active, so that the second security component forms core security components in high-availability mode. In high-availability mode, for example in the case of a symmetrical design of the second security component in comparison with the first security component, the same functions as in normal operation can be provided. In other words, in high-availability mode and if the second security component corresponds to the first security component in terms of its provided functionality, a functionality indistinguishable from normal operation can be provided.

However, the second security component is preferably designed asymmetrically in relation to its provided functionality, so that fewer functions are provided in high-availability mode, but the main functions are available in the security unit. This offers the advantage, inter alia, that both space and costs can be saved and the number of fault-prone components can be reduced. The impediment of the user can be minimized through the high-availability mode and the corresponding provision of the main functions.

The security components are furthermore preferably configured to communicate in the first operating mode between the first and/or the second security component and a unit disposed outside the control apparatus, and to communicate in the second operating mode only between the second security component and the unit disposed outside the control apparatus. In other words, communication can take place between the security components and an external unit in normal operation originating predominantly from the first security component, but can also be divided so that the communication similarly originates at least partially from the second security component. However, in the second operating mode or in high-availability mode, the communication originates only from the second security component. This offers the advantage, inter alia, that the communication facilities of the first security component are blocked externally if a fault is detected so that no data can be transmitted undesirably to an external unit. However, the second security component, which preferably has core security components, can continue to communicate externally in a secure manner and preferably by means of encryption, for example for a trusted communication within a vehicle network, since said second security component is designed as completely independent and is not affected by the detected fault in the first security component. The user can thus be notified in any situation and can be made aware of an existing fault.

In order to restore the first operating mode or normal operation following the detection of a fault, the second security component can be configured in the second operating mode to initiate a restart of the first security component, wherein the first monitoring unit is configured to monitor the restart of the first security component. The first security component is consequently not available in the second operating mode or in high-availability mode and is reset, wherein, for example, protocols and lists can be cleared and reset to factory settings, an operating system can be restarted and/or reinstalled, measuring instruments such as sensors can be recalibrated, etc.

The security components may furthermore include a plurality of subcomponents, wherein, for at least one of the subcomponents of the respective security component, a corresponding subcomponent is arranged in the respective other security component which is designed symmetrically or asymmetrically in relation to the provided functionalities. Alternatively or additionally, at least one of the subcomponents can be designed in exclusively one of the security components. At least one of the subcomponents preferably includes a monitoring unit. Consequently, in the case of a symmetrical design, as described above, the security function can be guaranteed, wherein reciprocal monitoring is preferred. A monitoring function can similarly be provided for individual subcomponents only.

The monitoring function is essentially not required for subcomponents which are designed in exclusively one of the security components. However, as a result, specific functions which do not have to be monitored are only present, for example, either in normal operation or in high-availability operation, so that functions that are not required for the high-availability operation of the security unit are arranged in the first security component only, for example in order to save space and costs and enable improved performance. Specific functions may similarly be available in the second security component only. This offers the advantage, inter alia, that specific security functions, for example, which are not required in normal operation, are activated if a fault is detected so that further functionalities are available to a user in high-availability mode.

However, it can also be provided that at least one of the security components has at least one pair of subcomponents which are designed symmetrically and wherein at least one of the two subcomponents includes a monitoring unit to detect a fault in the respective other subcomponent. Both subcomponents preferably have a corresponding monitoring unit. The subcomponents thus form a redundancy block in the security component. If said subcomponents are arranged in the first security component, this offers the advantage, inter alia, that the functions are present in the first operating mode even if one of the subcomponents fails, without the security unit having to be operated in high-availability mode. In other words, the functional capability of the first security component in normal operation is improved.

The first security unit is preferably configured as a security management unit, wherein the security components, preferably subcomponents of the security components, are configured to receive at least one warning signal from a unit which has a communication connection and to output a response signal allocated to the respective security component on the basis of the received warning signal and transmit it to a unit in the security device, in the control apparatus and or outside the control apparatus. The response signal allocated to the respective security component is preferably a specified and/or configurable response signal. The response signal can be transmitted to a unit inside the security device, for example in order to reset the security unit or a security application, but it can also be transmitted to a unit inside or outside the control apparatus in order to reset the control apparatus or to transmit a warning signal to an external unit.

The response signal is preferably configurable so that a user can decide and specify how the security device, security unit or control apparatus is to respond if a fault is detected, or which functions are to be activated and deactivated, and whether external units are to be notified. Although the security management unit or the data security management unit can be implemented as additional hardware, for example as a subunit of a microcontroller or processor, it can similarly be provided that the security management unit or data security management unit and the corresponding security components are implemented at least partially by means of software parts, such as, for example, through assignment in corresponding domains.

Furthermore, the security components are preferably configured to classify and group received warning signals. Thus, not only can a corresponding response signal be output, but the size and/or the processing time of warning signals can also be reduced.

The warning signal is preferably a security fault event relating to the securing of data communication and information in the control apparatus or a functional fault event in the first security unit. The warning signal may relate, for example, to a global functionality if this relates to the control apparatus or MCU. However, the warning signal may also indicate a local functionality, for example if it relates to a functional fault event of the security device. Consequently, the security management unit enables the processing of corresponding warning signals so that a corresponding response can be output with a corresponding response signal.

Furthermore, the second security component preferably includes a counter, so that the number, type and/or sequence of the received security fault events, for example during temporary malfunctions in normal operation or in high-availability mode, can be stored. The second security component can similarly store or log the security fault events in a secured storage medium, wherein the storage medium can be read following a restart in renewed normal operation and/or from an alternative external unit. It can similarly be provided that the number and/or type of the restart is/are logged. The second security component can thus have a black-box function.

However, security fault events can also occur and/or be signaled on other components of the control apparatus. Accordingly, the security device preferably furthermore includes at least one monitor and/or a function block which is arranged outside a security domain of data communication and information of the security device and inside the security apparatus, wherein the monitor and/or the function block is/are configured to detect a warning signal, in particular a security fault event, and transmit it to a unit outside the security domain or to the security management unit.

For example, a monitor can be provided which has security functionality for the first and/or second operating mode and can record or detect, for example, a voltage, a temperature, a time, an ageing, a pressure, and/or light, etc. If faults or deviations from a specified range are detected, this is recognized as a security fault event which is transmitted to the security management unit. The security management unit can respond to this by outputting a corresponding response signal.

A functional block can furthermore be configured to be operated as an attack detection system or as a firewall. If an attack or a security breach is detected, this is recognized as a security fault event and is transmitted as such, as described above for the monitor, to the security management unit.

However, a functional block can also be designed as a crypto satellite, a second encryption unit or a satellite encryption unit. The satellite encryption unit is formed around a communication connection or COM ("communication port") which enables the signing, encryption, decryption, authentication and/or authenticated encryption of associated data by means of a key stored in a key memory and a symmetrical accelerator. To do this, the satellite encryption unit furthermore has a data sink or source which forms an interface with the COM.

The data sink furthermore communicates with a decision unit, wherein the decision unit is set up to configure the satellite encryption unit and control a data stream within the satellite encryption unit. The decision unit is furthermore configured to detect and collect fault events. The fault events are then recognized as security fault events and are transmitted accordingly to the security management unit, as described above. It can thus be ensured with encryption that, for example, encrypted or signed messages can be transmitted to a receiver outside the MCU in order to ensure authenticity and confidentiality when an MCU malfunction is signaled.

The security device may furthermore include a second security unit, functional safety unit, which is configured to secure functional units. The first security unit is configured to transmit warning signals from the first security unit as at least one configurable warning signal selectively to the second security unit, wherein the second security unit is configured to output a configurable response signal in response to the reception of the at least one configurable warning signal. Consequently, the first security unit can communicate selectively with the second security unit.

It can thus essentially be provided that the first security unit no longer communicates with the second security unit and communication between the first security unit and other units is thus largely avoided. The events in the first security unit or in the first security domain are therefore not evident to the second security unit or to the remaining components of the control apparatus or MCU. This simultaneously also offers the advantage that all events which relate to functional safety can be processed only in the second security unit.

However, in the case of a security fault event, the first security unit can transmit security fault events to the second security unit so that the second security unit can act accordingly. This can be done selectively so that only a subgroup of the security fault events can also be transmitted. Functional components in a vehicle can thus, for example, be restricted, for example by automatically activating the flashing warning light, by limiting the speed of the vehicle or by increasing the distance that is to be maintained from another vehicle in order to increase the safety of the occupants.

The response signal can preferably be specified by a manufacturer or user. It can similarly be provided that the communication between the first security unit and the second security unit is configurable so that the security fault events to be transmitted can similarly be specified by a manufacturer or user.

The second security unit is preferably configured as a security management unit and is furthermore configured to transmit security fault events of the second security unit as a configurable warning signal selectively to the first security unit, wherein the first security unit is configured to output a configurable response signal in response to the reception of the warning signal. The first security unit can also be alerted accordingly if a fault is present in the second security unit. The response signal can inform the user accordingly, wherein the response signal can simultaneously cause components in the first security unit to be activated and/or checked more frequently. Similarly, the first security unit can be operated in a second operating mode in response to the received warning signal in order to effect a general check and/or a reset of a part of the system.

The first and second security unit together preferably form the security device. The functional safety management unit and the data security management unit can have a divided hardware component in the second security component, wherein a data encapsulation can preferably be implemented in order to increase integrity. The security device consequently has the facility to distinguish between fault events and process them within the relevant domain, for example a functional safety domain and a data security domain.

The security device can, for example, distinguish on the basis of the fault events between faults which relate to functional safety only, which relate to both functional safety and data security, and which relate to data security only. On the basis of this grouping or classification, the respective security unit can output a corresponding response signal which is preferably configurable by a user or manufacturer.

The security device can furthermore be arranged as an additional hardware part in the control apparatus which has a physical and logical communication connection to an external unit arranged outside the control apparatus. The user is thus afforded a higher degree of freedom. The security device can furthermore ensure the security monitoring during a temporary failure of the core security components of the control apparatus.

The second security unit can furthermore be divided in a manner similar to the first security unit. The second security unit can thus include a third security component to operate in a first operating mode and a fourth security component configured to operate in a high-availability mode. Preferably, the third and fourth security component are arranged inside the control apparatus, a clock domain of the third security component is different from a second clock domain of the second security component, and/or a voltage domain of the third security component is separated from a further voltage domain of the fourth security component. The first security unit can furthermore preferably be configured to transmit the warning signal from the first security unit to the security component of the second security unit corresponding to the operating mode, wherein the respective security component of the second security unit is configured to output a configurable response signal in response to the reception of a warning signal. It is thus provided that the corresponding security components of the first and second security unit can communicate with one another in one operating mode.

In order to further improve the availability and reliability of the security units and security device, the second security unit can have a communication connection to a monitoring unit of the first security unit, wherein the monitoring unit of the first security unit is configured to detect security fault events of the first security unit and transmit them to the second security unit, and wherein the monitoring unit of the first security unit is arranged in a functional safety domain of the security device.

The monitoring unit of the first security unit is thus separated from a data security domain and in any event from the first security unit, but has a communication connection to the latter. This offers the advantage, inter alia, that, in the case of an erroneous or even defective behavior of the security device, wherein the first security unit or first security management unit fails, this is recognized accordingly by the monitoring unit of the first security unit in the functional safety domain and the monitoring unit transmits a warning signal or an alarm to the second security unit in order to effect a complete reset and restart of the first security unit or security management unit. In this case, the monitoring unit can be configured to monitor the restart request and the restart of the security unit or security management unit.

A corresponding monitoring unit can furthermore be provided in the security domain of data and information. The first security unit can accordingly have a communication connection to a monitoring unit of the second security unit, wherein the monitoring unit for monitoring the second security unit is configured to detect security fault events of the second security unit and transmit them to the first security unit. The monitoring unit of the second security unit is arranged in a security domain of data communication and information of the security device. The monitoring unit of the second security unit can thus perform the same functions as described above for the monitoring unit of the first security unit.

The security device furthermore preferably includes at least one third monitoring unit to operate in a high-availability mode, wherein the third monitoring unit is configured to detect a fault present in the third security component and is arranged in the fourth security component and has a communication connection to the latter. The fourth security component is preferably configured to output a third response signal if a fault is detected by the third monitoring unit, wherein the high-availability mode is available independently from the first operating mode. The security device can furthermore preferably include a fourth monitoring unit to detect a fault present in the fourth security component which has a communication connection to the third security component and is arranged therein.

The fourth security component can furthermore preferably be configured to output a response signal if a fault is detected in the third security component. The security device can similarly include a fourth monitoring unit to detect a fault present in the fourth security component which has a communication connection to the third security component and is arranged therein. A reciprocal monitoring of the third and fourth security components can thus be provided, similar to that described above for the first and second security component.

The second and/or fourth security component can furthermore be configured to be operated in an idle mode until a fault is detected by the corresponding monitoring unit, and to be activated only on detection of a fault by the corresponding monitoring unit or in a high-availability mode of the security unit and/or control apparatus. Essentially less power is thus required and the respective components can be used more sparingly and energy can be saved, while the components are activated immediately if a fault is detected. The second security component and/or the corresponding monitoring unit can also be active in the background when other components are in idle mode so that the security status is continuously monitored and other components can be activated in the event of a fault. It is thus possible, for example, to respond to "wake-up events", such as, for example, an external wake-up signal, wake-up protocols or wake-up protocol packets, via a communication network in the automotive sector, etc., in order to thus respond, for example, to DoS attacks while a unit, for example a unit of a vehicle, is not being used.

It can furthermore be provided that the idle mode is interrupted after a predefined number of faults or security fault events and the corresponding security components are activated. The idle mode can thus, for example, be interrupted after a plurality of recognized wake-up events for which essentially no response is provided, and the entire control apparatus or MCU can be instructed to respond to an attack, wherein, for example, a battery status can be checked and maintenance messages relating to an unexpected system behavior can be transmitted to an external unit.

The security device can furthermore be integrated into a system. A system is proposed accordingly which includes a control apparatus to operate at least one unit arranged outside the control apparatus and a security device which has a communication connection to the control apparatus. The security device has a security device according to the invention described above, wherein the security device is configured to secure the control apparatus.

In addition, the security device can be configured to receive warning signals from a satellite encryption unit, wherein the satellite encryption unit includes a key memory, a symmetrical hardware accelerator, a data sink or data source and a decision unit which is configured for the signing, encryption, authentication and/or authenticated encryption of data provided by the data source or received at the data sink, in each case using the hardware accelerator and the key memory. The decision unit can furthermore be configured to recognize a fault in the signing, encryption, authentication and/or authenticated encryption and to output a warning signal to the security unit.

The decision unit can furthermore be configured to monitor a behavior of the data sink and output a warning signal to the security unit in the event of deviations from an expected behavior.

The control apparatus and the control unit can furthermore be arranged in a common housing. The control apparatus and the control unit can furthermore be implemented on a chip, wherein the control apparatus and the control unit are preferably implemented in a common package. The unit arranged outside the control apparatus is preferably a unit of a vehicle. The security device can thus, for example, be implemented on a chip which can be used in the automobile industry in order to improve the security of data and the safety of occupants.

A method for operating a security device for securing data, data communication, information and functional blocks of a control unit is furthermore proposed. The method includes at least operating a first security component of a security unit in a first operating mode and monitoring the first security component by means of a monitoring unit to detect a fault in the first security component. The monitoring unit communicates with a second security component of the security unit and is arranged in the second security component. The method furthermore includes the output of a response signal which originates from the second security component if a fault in the first security component is detected by the monitoring unit. This offers the advantage, inter alia, that the security unit operates completely independently by means of the second security component, given that said second security component is separated from the first security component, and can thus always output an indication if a security fault is present.

It can furthermore be provided that the second security component is operated in a high-availability mode and the first security component is restarted if a fault in the first security component is detected by the monitoring unit. The monitoring unit can monitor the restart of the first security component and can accordingly release the operation in the first operating mode once more following the restart if no faults are detected.

Further method steps which correspond to the described functions of the security device according to the invention can furthermore be provided in the method.

BRIEF DESCRIPTION OF THE DRAWINGS

Preferred further embodiments of the invention will be explained in detail by means of the following description of the figures. The following is shown in the figures.

DETAILED DESCRIPTION

Preferred example embodiments are described below with reference to the figures. Elements which are the same or similar or operate in the same way are denoted with identical reference numbers in the different figures. The description of these elements is not repeated in some instances in order to avoid duplication.

Preferred example embodiments are described below with reference to the figures. Elements which are the same or similar or operate in the same way are denoted with identical reference numbers in the different figures. The description of these elements is not repeated in some instances in order to avoid duplication.

Figure 1:
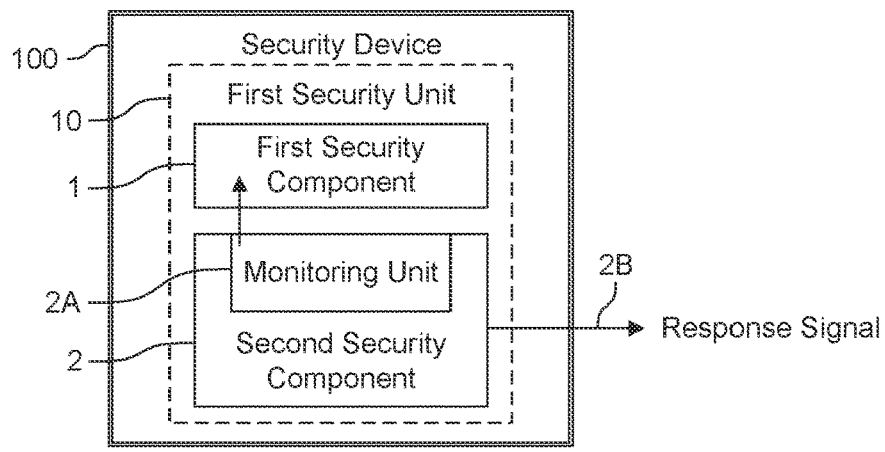
FIG. 1 shows a schematic representation of a first security unit with a monitoring unit.

FIG. 1 shows schematically a first security unit 10. The security unit 10 is arranged here in a security device 100 and comprises a first security component 1 and a second security component 2. The security unit 10 serves to secure data and information and is arranged accordingly in a data security domain of the security device 100, wherein the security components 1, 2 together form the core security components. In other words, the security components 1, 2 form a "root of trust", so that these are the components which are regarded by a control apparatus essentially as trusted and reliable. The first security component 1 enables the security function of the security unit 10 in a first operating mode, e.g. a normal operation, whereas the second security component 2 enables the security function of the security unit 10 in a second operating mode, e.g. a high-availability mode. The security device 100 can be implemented as hardware, for example as part of a microprocessor, part of a circuit, part of an electronic control unit (ECU), or at least partially as software, for example in a specified and defined domain.

The second security component 2 has a monitoring unit 2A which is arranged in the second security component 2 and therefore has a communication connection to the latter. The monitoring unit 2A is configured to monitor or check the first security component 1 for the presence of faults, as shown schematically by the arrow. If a fault is detected, the second security component 2 is configured to output a response signal 2B. This response signal 2B is preferably arranged outside or externally to the security device 100 and to a control apparatus (not shown). However, it is also possible for the response signal 2B to be transmitted to a unit inside the security device 100. The response signal may, for example, have a warning message, for example in the form of a voltage signal or current signal.

The first and second security component 1, 2 are designed here symmetrically. This means that the second security component 2 can perform all functions of the first security component 1. If a fault is detected in the first security component 1, the security unit 10 can switch from a normal operating mode to the high-availability mode, wherein the second security component 2 takes over the security functions of the security component 1. All functions of the first security component 1 in the first operating mode are available in the high-availability mode, so that a user perceives essentially no or hardly any hindrance, since the functionality of the first security component 1 is still available even if it fails.

Figure 2:
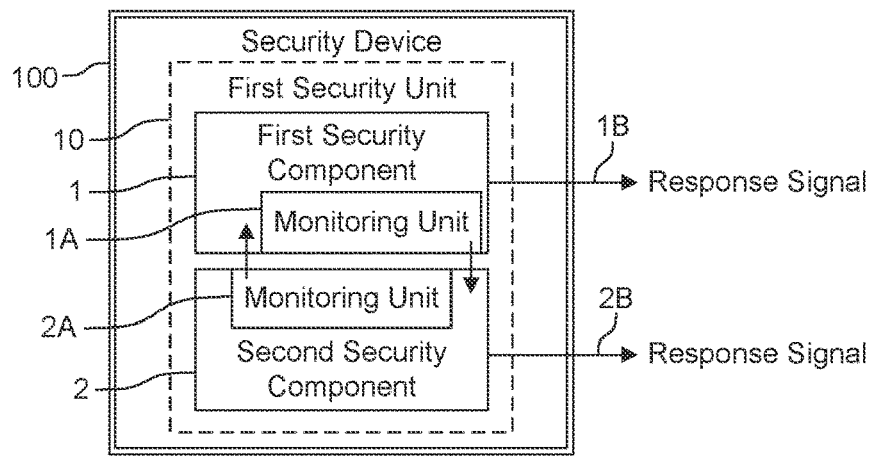
FIG. 2 shows a schematic representation of a first security unit with mirrored monitoring units and an asymmetrical design.

Alternatively, however, the security components 1, 2 can also be designed asymmetrically, as shown schematically in FIG. 2. Here, the second security component 2 comprises fewer and/or different functions compared with the first security component 1, so that fewer and/or different functions are available during operation in high-availability mode compared with operation of the first security component 1 in the first operating mode.

In this embodiment, a second monitoring unit 1A is similarly arranged in the first security component 1. The second monitoring unit 1A performs the same function as the first monitoring unit 2A, so that the security components 1, 2 can reciprocally monitor one another, as shown by the two arrows. Consequently, if a fault in the second security component 2 is detected by the second monitoring unit 1A, this is forwarded to the first security component 1 and a response signal 1B is output. Consequently, it is signaled to a unit superordinate to the security unit 100, e.g. an ECU (not shown), that a fault has occurred. With the signaling to the ECU, the ECU has possibilities to respond. A response of this type can comprise a deactivation or restart of the failed security component 1, 2, as well as an operation in a safe mode with reduced functionality. Although the reciprocal monitoring is shown in FIG. 2 for security components with asymmetrical functionality, this monitoring can similarly be provided for the security components 1, 2 which are designed symmetrically or have symmetrical functionality. A reciprocal monitoring with symmetrical functionality is shown, for example, in FIG. 4.

Figure 3:
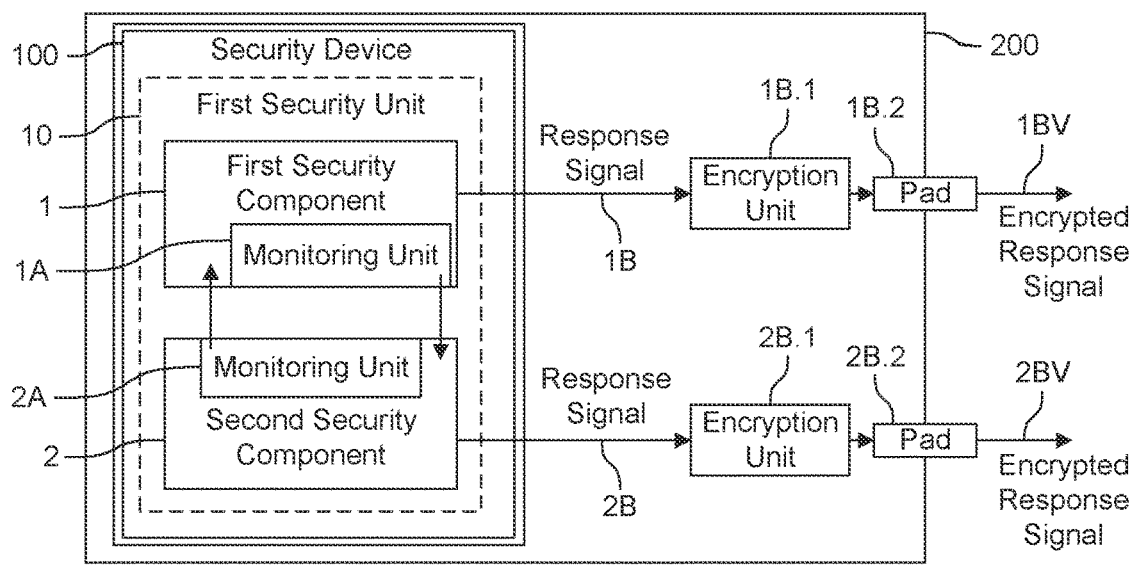
FIG. 3 shows a schematic representation of a first security unit as shown in FIG. 2, with encryption units and pads or pins for a response signal.

In FIG. 3, the security unit 10 is designed as in FIG. 2 and is arranged in a control apparatus 200. Here, the control apparatus 200 is an ECU. In this embodiment, the response signal 1B, 2B can be encrypted in an encryption unit 1B.1, 2B.1 of the respective security components 1, 2 before they are transmitted as encrypted response signals 1BV, 2BV. The encrypted response signals 1BV, 2BV are preferably transmitted to a unit arranged outside the control apparatus 200. In the present disclosure, the term "encrypted response signals" comprises signed signals, encrypted signals, and also signed and encrypted signals. The encryption unit 1B.1, 2B.1 is arranged here in each case outside the security device 100 and inside the control apparatus 200. However, it can also be provided that the respective encryption unit 1B.1, 2B.1 is arranged in the security device 100 or even in the respective security component 1, 2.

Following successful encryption, the data are then transmitted via a pad or pin 1B.2, 2B.2 to a unit outside the ECU 200. The pads and pins 1B.2, 2B.2 form a secure and defined communication connection, as a result of which the security and reliability of the security components 1, 2 and the ECU 200 are further improved.

Although the encryption is shown here with the encryption units 1B.1, 2B.1, this is not absolutely necessary. Consequently, it is also possible to transmit the response signal 1B, 2B directly to an external unit via the pads or pins 1B.2, 2B.2 without providing encryption units 1B.1, 2B.1. In other words, the pads or pins 1B.2, 2B.2 can also be used in conjunction with the embodiments shown in FIGS. 1 and 2.

A person skilled in the art will understand that, although individual pads or pins 1B.2, 2B.2 are allocated to the respective security component 1, 2 in FIG. 3, this is to be understood by way of example only. More than one pad or pin 1B.2, 2B.2 can obviously also be allocated to one of the security components 1, 2. An allocation of this type would, for example, be of interest if the response signals 1B, 2B were intended to be transmitted as differential signals.

Figure 4:
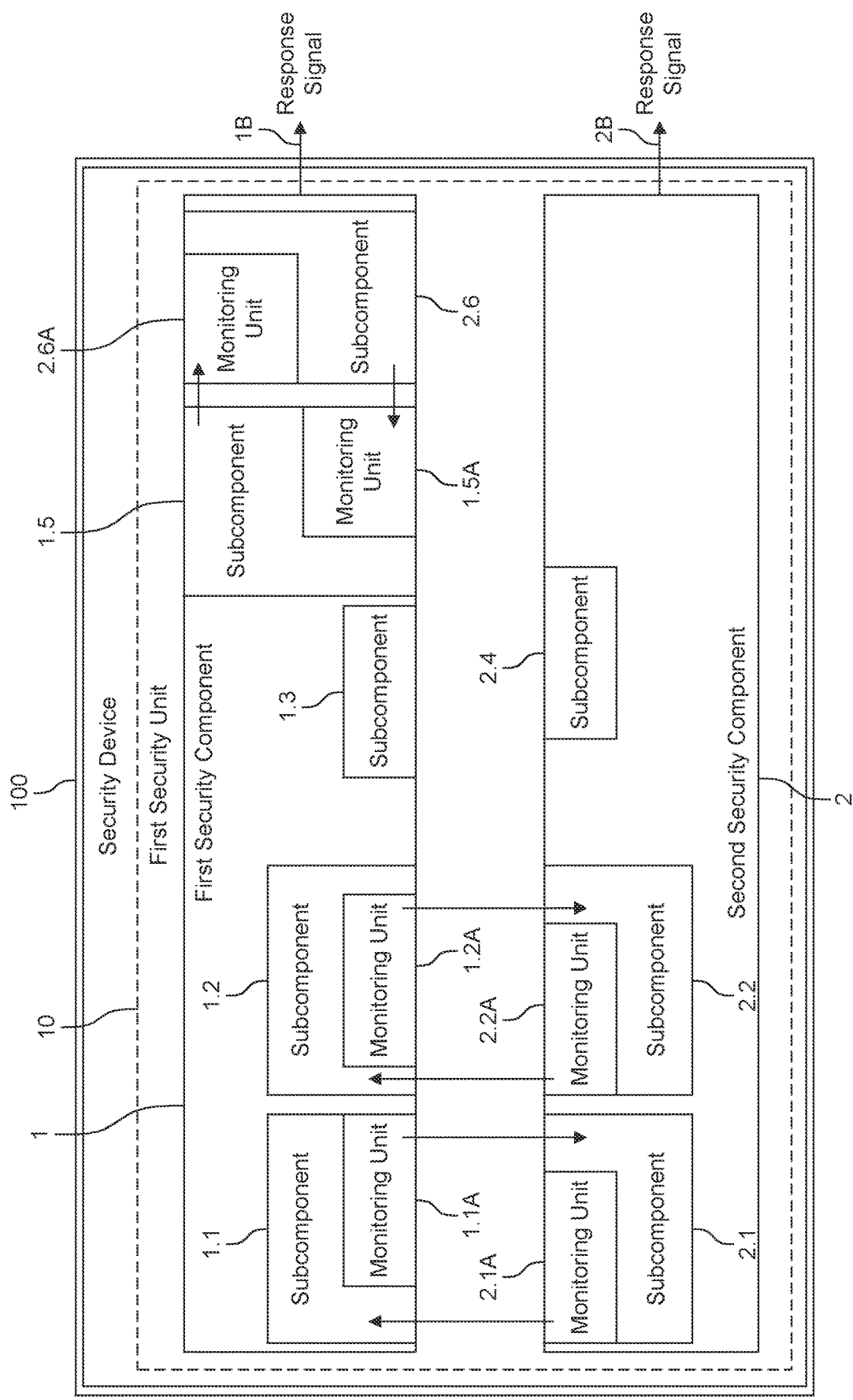
FIG. 4 shows a schematic representation of a first security unit, wherein the security components have subcomponents.

FIG. 4 shows further embodiments of the security components 1, 2 which can be provided alternatively or additionally to one another inside a security device 100. Here, the security components 1, 2 have subcomponents. The corresponding subcomponents of the security components 1, 2 can thus be designed symmetrically to one another with regard to their provided functionality, as shown with the subcomponents 1.1 and 2.1 and indicated by their identical dimensioning in FIG. 4. The symmetrical subcomponents 1.1 and 2.1 in each case have a monitoring unit 1.1A, 2.1A already described in detail above. The subcomponents 1.1 and 2.1 functionally form a redundancy block due to the symmetrical functionality of the subcomponents 1.1, 2.1. The full functionality of the subcomponents 1.1 and 2.1 is available in both the first operating mode and the high-availability mode.

However, it is also possible for the subcomponents to be designed asymmetrically with the subcomponents 1.2, 2.2 on the basis of the different size shown in FIG. 4. Furthermore, as shown for these subcomponents 1.2, 2.2, the monitoring can be asymmetrical, so that the monitoring unit 2.2A of the subcomponent 2.2 can completely monitor the subcomponent 1.2, but the monitoring unit 1.2A of the subcomponent 1.2 can monitor only a functional subsection of the subcomponent 2.2. In other words, the monitoring unit 1.2A of the subcomponent 1.2 can provide only a selection of the functionality of the subcomponent 2.2.

A monitoring by the asymmetrical monitoring units 1.2A, 2.2A may be of interest, for example, in order to monitor by means of the monitoring unit 2.2A in high-availability mode only those functions of the first subcomponent 1.2 which are also made available in high-availability mode by the second subcomponent 2.2. Due to higher costs or other restrictions for functionality in the high-availability mode of the second subcomponent 2.2, it may be favorable to restrict the functionality of the second subcomponent 2.2 and also the monitoring unit 2.2A. Due to the asymmetrical design of the monitoring unit 1.2A, 2.2A, the first and second subcomponent 1.1, 2.2 form a redundancy block in relation to the functionality of the subcomponent 2.2 provided in high-availability mode, as explained in connection with FIG. 3.

However, as an alternative to a symmetrical design of the subcomponents 1.1, 2.1 or an asymmetrical design of the subcomponents 1.2, 2.2, separate subcomponents can also be provided. This is shown with the subcomponents 1.3, 2.4 in FIG. 4. The subcomponent 1.3 is provided only in the first security component 1, whereas the subcomponent 2.4 is provided only in the second security component 2. A reciprocal monitoring is not provided here, especially as different functions would have to be monitored. However, this is similarly possible (not shown). Different security functions which can be chosen depending on the security requirement of an application are consequently available here in a normal operation and in a high-availability operation.

Similarly, the redundancy block described above can also be provided inside one security component only. This is shown in FIG. 4 in the first security component 1 for subcomponents 1.5, 2.6 with the corresponding monitoring units 1.5A, 2.6A. The subcomponents 1.5, 2.6 can be allocated here to different voltage domains or clock domains, so that an independent or semi-autonomous security function is provided here also. A redundancy block can be created in relation to a voltage supply or a clock frequency by providing the subcomponents 1.5, 2.6 in different voltage domains or clock domains. However, this "horizontal" redundancy block of the subcomponents 1.5, 2.6 is available only within one operating mode.

Figure 5A:
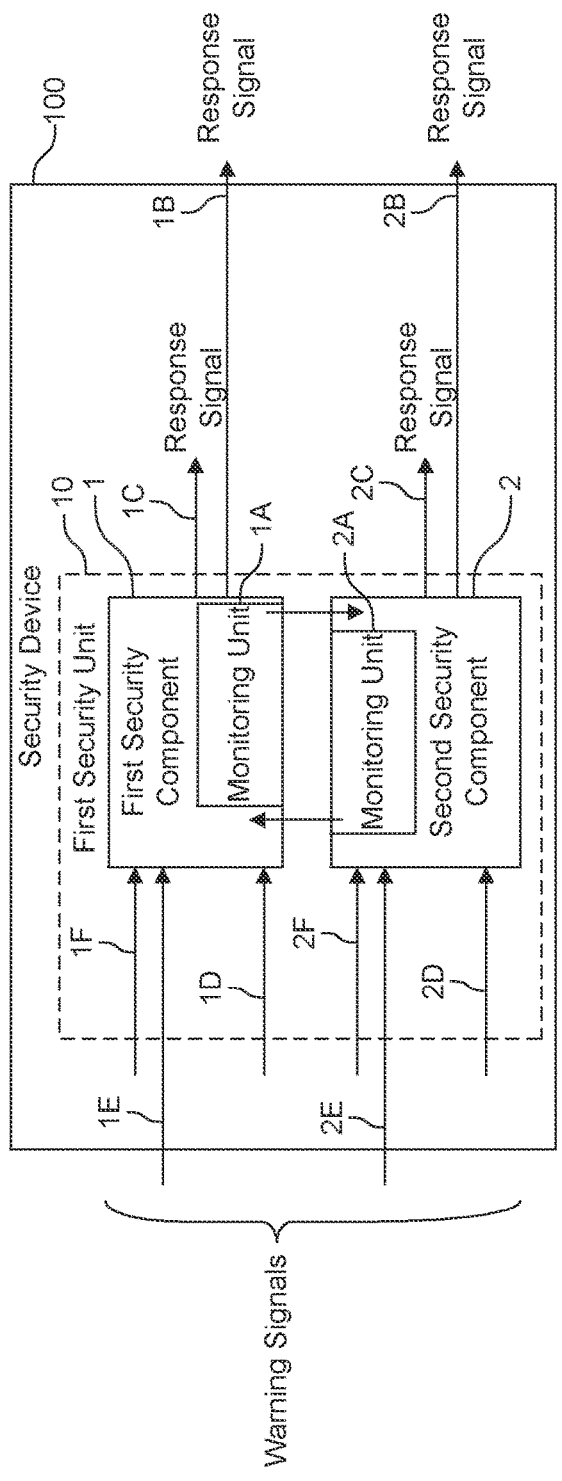
FIG. 5A shows a schematic representation of a first security unit, wherein the security device is designed as a security management unit.

In FIG. 5A, the security unit 10 is arranged in the security device 100, wherein the security device 100 is configured or designed as a security management unit. The security management unit 100 is preferably formed from a subcomponent, as shown in FIG. 4, so that the security management unit 100 forms a hardware component in the control apparatus (not shown). The security components 1, 2 and the monitoring units 1A, 2A of the security components 1, 2 are configured or designed similar to those in FIGS. 2 to 4.

Through the additional management function, the security components 1, 2 are configured to receive warning signals 1D, 1E, 2D, 2E. The warning signals 1D, 1E, 2D, 2E may comprise those warnings, fault events or security fault events which relate to errored data, errored or corrupted data communication and/or corrupted or errored information. It should further be noted that warning signals of this type can also be used to signal that a functional block is no longer operating reliably which indicates that its functional reliability, also referred to as function security, is impaired or is no longer provided.

The security components 1, 2 in FIG. 5A are configured to receive security fault events 1D, 1E, 1F, 2D, 2E, 2F, as indicated by the corresponding arrows.

In one embodiment according to FIG. 5A, it can be provided that warning signals can be received by the security device 100 or control apparatus ECU, but outside the security unit 10, and can also be received from inside the security device 100 or control apparatus ECU, as shown in FIG. 5A and as will be explained below.

The warning signal 1E can thus be received by the security device 100 and can be forwarded to the first security unit 10 and can be passed on there to the first security component 1. The warning signal 2E is received by the security device 100 and is forwarded to the first security unit 10 and is passed on there to the second security component 2. The warning signal 1E can be received in normal operation, whereas the warning signal 2E can still be received in high-availability mode also.

Conversely, the warning signals 1D, 1F are generated inside the security device 100 or control apparatus ECU (not shown), but outside the first security unit 10, are transferred to the first security unit 10 and are passed on there to the first security component 1. The warning signals 1D, 1F can be generated and received in normal operation, but not in high-availability mode. The warning signals 1D, 1F may relate to indications of the functional safety of individual functions in the normal operation domain. The functions protected by functional safety indications 1D, 1F are typically no longer provided within the security unit 10.

The warning signals 2D, 2F are similarly generated inside the security device 100, but outside the first security unit 10, are transferred to the first security unit 10 and are passed on there to the second security component 2. The warning signals 2D, 2F can be received in high-availability operation, but not in normal operation. The warning signals 2D, 2F may relate to indications of the functional safety of individual functions in the high-availability mode domain. The functions protected by warning signals relating to functional safety 2D, 2F are typically no longer provided within the security unit 10. The warning signals may thus comprise both internal and global or external indications.

The security management unit 100 is furthermore configured to process the warning signals 1D, 1E, 1F, 2D, 2E, 2F and to output a corresponding response signal 1B, 1C, 2B, 2C by means of the respective security component 1, 2. The response signal 1B, 1C, 2B, 2C can be configurable by a user and can be transmitted to a unit in the security device 100, as shown by the arrows 1C, 2C, in the control apparatus and/or to a unit outside the control apparatus, as shown by the arrows 1B, 2B. Although not shown here in further detail, the response signal can furthermore be transmitted via an encryption unit and/or a pin, as described and shown in FIG. 3, to a corresponding unit in the security device 100, in the control apparatus and/or outside the control apparatus.

A reciprocal monitoring is possible for the security components 1, 2 shown in FIG. 5A also, as already explained in connection with FIG. 1-4. The security components 1, 2 can thus be monitored by monitoring units 1A, 2A, wherein one of the monitoring units 1A, 2A is allocated to each of the security components 1, 2. Although the monitoring units 1A, 2A shown in FIG. 5A are shown as asymmetrical, they could also be designed symmetrically if required.

Figure 5B:
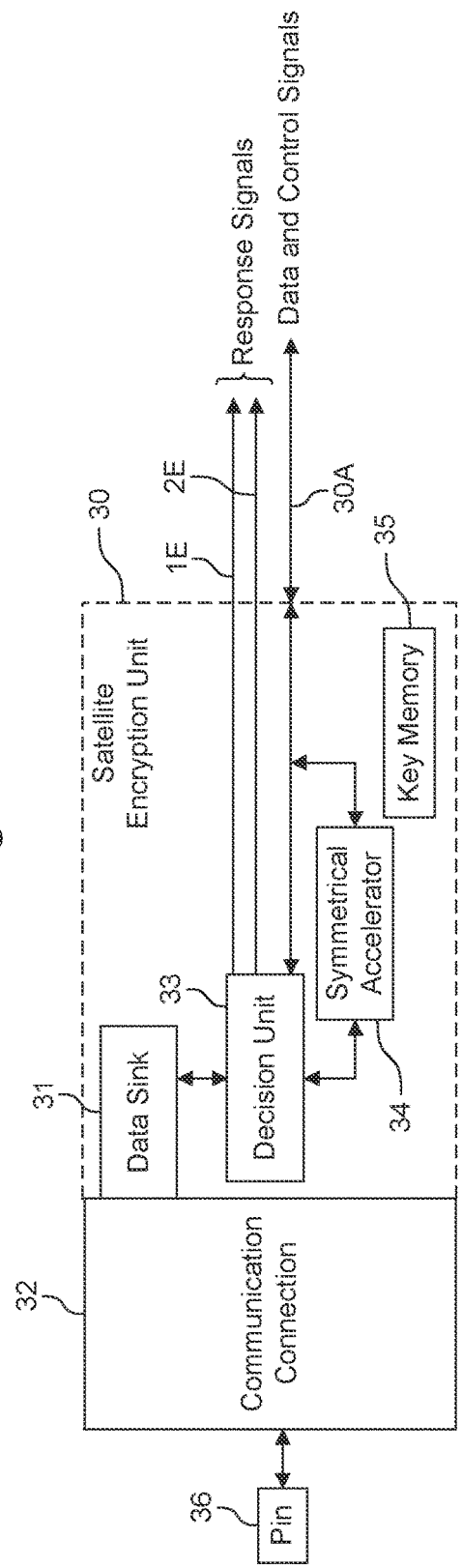
FIG. 5B shows a schematic representation of a functional block which is designed as a satellite encryption unit.

As shown by the arrows 1E, 2E, the security fault events can also comprise global security fault events relating to data security and cyber security. A monitor or a functional block, for example, can be provided which is arranged outside the security device or data security domain and inside the control apparatus. A functional block of this type is shown in detail separately in FIG. 5B. The functional block is designed here as a satellite encryption unit 30. The satellite encryption unit 30 is formed around a communication connection 32 or COM ("communication port") which enables the signing, encryption, decryption, authentication and/or authenticated encryption of associated data by means of a key stored in a key memory 35 and a symmetrical accelerator 34. To do this, the satellite encryption unit furthermore has a data sink or source 31 which forms an interface with the COM 32.

The COM 32 can communicate externally, receive data and/or be connected to an external unit (not shown) by means of a pin 36. The data sink 31 furthermore communicates with a decision unit 33, wherein the decision unit 33 is set up to configure the satellite encryption unit 30 and control a data stream within the satellite encryption unit 30. As already discussed in connection with the embodiment shown in FIG. 3, the pin 36 could also be designed in the form of two pins or contact points, which may be of interest in the transmission of the (encrypted) response signals in differential form.

The decision unit 33 is furthermore configured to detect fault events in the signing, encryption and signed encryption using a key memory 35 and a hardware accelerator 34. The fault detection by the decision unit 33 is equally possible for data generated by the data source 31 and for data received by the data sink 31.

In particular, the decision unit 33 is able to monitor the behavior of the data sink 31. By means of this monitoring, it can be detected if more data than expected are received via an interface 32 connected to the data sink 31. For a deviation of this type, the decision unit 33 can transmit a warning signal 1E, 2E to the first security unit 10. The first security unit 10 could then decide to deactivate the interface 32 so that this attack surface is no longer offered to a suspected attacker.

Figure 6:
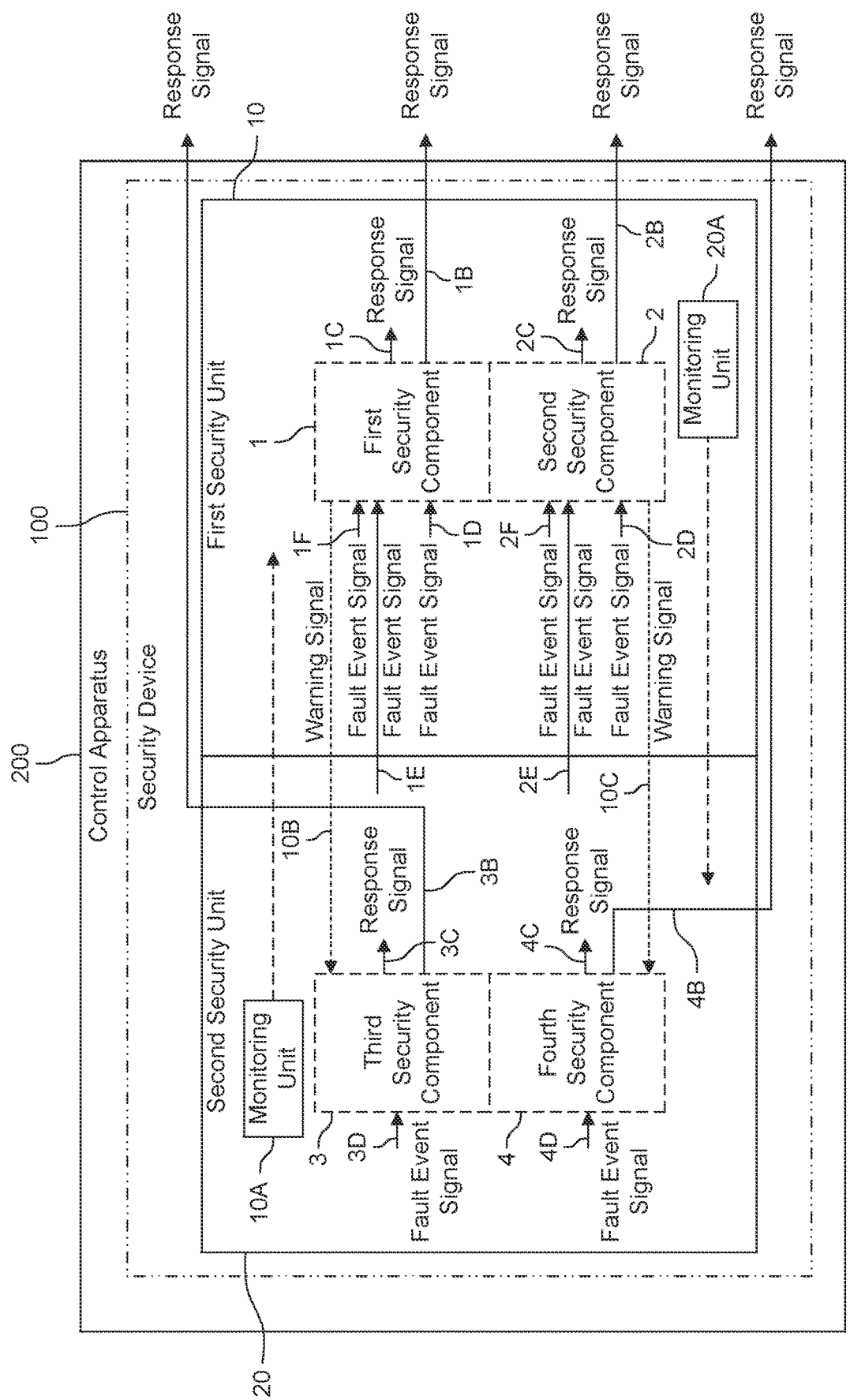
FIG. 6 shows a schematic representation of a first security unit and a second security unit which together form a security device.

In FIG. 6, a second security unit 20 is provided along with the first security unit 10, said units together forming a security device 100. The second security unit 20 is arranged in a domain which relates to the functional safety of the control apparatus 200, whereas the first security unit 10 is arranged in the data security domain described above. In the embodiment according to FIG. 6, the security device 100 is configured as a security management unit, so that the second security unit 20 forms a functional safety management unit, also known as a "safety management unit" or SMU, and the first security unit 10 forms a data security management unit also referred to below as a "security management unit" or SECMU. In other words, the first security unit 10 is responsible for securing data, data communication and information in a security domain, as already explained in connection with FIG. 5A.

Conversely, the second security unit 20 is responsible for securing individual functional blocks, the operation of which is to be guaranteed in connection with functional safety. The first security unit 10 can have the same functions as the security unit 10 shown in FIG. 5A, so that different warning signals or security fault events 1D, 1E, 1F, 2D, 2E, 2F can be received by the respective security components 1, 2. However, in contrast to the representation in FIG. 5A, the security fault events 1E, 2E have not been generated outside the security device 100 but outside the first security unit 10 and inside the second security unit 20. The second security unit 20 can thus become the source of security fault events 1E, 2E which thereby become important for the first security unit 10.

On the one hand, a first security unit 10 is provided with security components 1, 2 in order to guarantee the data security function in a first or second operating mode. As in the previous example embodiments also, the first security component 1 is designed to operate in the normal operating mode and is therefore no longer available if only the high-availability mode is available. The first security component 1 can receive the security fault events 1D, 1E, 1F of the normal operating mode.

Conversely, the second security component 2 is designed to operate in the high-availability mode, which is still available even if the normal operating mode is no longer possible. The second security component 2 can receive the security fault events 2D, 2E, 2F of the high-availability mode.

Conversely, the second security unit 20 is provided with a third security component 3 and a fourth security component 4 in order to ensure the functional safety and functional capability of functional units. As in the previous example embodiments also, the third security component 3 is designed to operate in the normal operating mode and is therefore no longer available if only the high-availability mode is available. The third security component 3 can receive the warning signal 3D of the normal operating mode. This is shown in FIG. 6 as being generated in the second security unit 20. However, without restriction it could also have its origin outside the second security unit 20, outside the security device 100, or even outside the ECU.

Conversely, the fourth security component 4 is designed to operate in high-availability mode, which is still available even if the normal operating mode is no longer possible. The fourth security component 4 can receive the warning signal 4D of the high-availability mode. The warning signal 4D is shown in FIG. 6 as being generated in the second security unit 20. However, without restriction it could also have its origin outside the second security unit 20, outside the security device 100, or even outside the ECU.

The warning signals 3D, 4D which relate to functional safety aspects can furthermore be received and processed by the respective security components 3, 4 so that the security components 3, 4 output a corresponding response signal and transmit it to a different unit, either inside the second security unit 20, as shown by the arrows 3C, 4C, or to an external unit which is arranged outside the security device 100 or control apparatus, as indicated by the arrows 3B, 4B.

A connection is furthermore provided between the respective security components 1, 2, 3, 4. Warning indications can thus be transmitted from the first security component 1 via a corresponding connection 10B to the third security component 3 and from the second security component 2 via a corresponding connection 10C to the fourth security component 4. Thus, if a data security fault is present, the SMU can be notified and the user can be alerted accordingly to a security problem. The SMU can furthermore arrange for the functional components to be restricted. If the control apparatus controls or regulates a unit in a vehicle, the speed of the vehicle, for example, or a distance that is to be maintained between the vehicle and another vehicle can thus be regulated accordingly.

Although this is not shown in FIG. 6, it can furthermore be provided that the security components 3, 4 of the SMU transmit warning indications via a corresponding connection to the security components 1, 2 in order to arrange, for example, a further or more extensive data security monitoring in the event of a functional fault, or to operate the second security unit in a high-availability mode.

The warning indications received from the security components 3, 4 of the SMU regarding functional errors may be analyzed for predetermined pattern indicative of a security attack. The analysis may take into account warning indications over a certain period of time and/or warning indications of one or more security components. For instance, reoccurrence of warning indications may be an indicator for an unauthorized external access of data used, e g. stored or communicated, in a car. An analysis unit (not shown) may for instance analyze warning indications of the security component 3 for a reoccurring pattern and/or for a simultaneous pattern of warning indications of the security component 3 and 4. The analysis unit may also perform an analysis of warning signals provided by security components 1 and 2, since also the warning indications in the security domain itself may be indicative of a specific security attack. The analysis unit may be implemented as part of the security unit 20 and may be configured to issue control signals, for instance to slow down the motor speed or to report to the security unit 10 which may output a respective security indication. The analysis unit may alternatively or in addition be implemented as part of the security unit 10. The analysis results or resulting warning indications may be stored in a volatile or nonvolatile storage unit and may be provided to further security systems or external analyses, e.g. at maintenance checks. Exemplary patterns to be observed could be one or more of erroneous access to the debug access of the MCU, number of boot cycles from the reset in which an attacker might try to gain access to the MCU, number and type of bus master resets, e.g, which bus master how may resets of which type, separate or combined information regarding MCU's internal or external clock-voltage and temperature behavior over time, e.g. an attacker might try to increase the clock frequency as long as he succeeds in flipping one or more flip-flops (registers), CPU lockstep error/warning signals, error correction data of volatile and non-volatile memory.

It can similarly be provided that the response signals to be output or the transmission of data to internal or external units passes via an encryption unit and/or a pin, as described in detail with reference to FIG. 3.

In the embodiment according to FIG. 6, a monitoring unit 10A to monitor the first security unit 10 and a monitoring unit 20A to monitor the second security 20 are furthermore provided. In the event of a failure or major fault or defect in the security units 10, 20 to be monitored, the monitoring units 10A, 20A enable the output of a corresponding indication. The monitoring unit 10A thus has a communication connection to the second security unit 20 configured as an SMU, so that, in the event of a defect or failure of the first security unit 10, configured as a SECMU, the SMU can be informed of this by the first monitoring unit 10A and the SMU can inform the user and can arrange a complete reset or restart of the SECMU. The advantage of a monitoring unit 10A, 20A of this type is thus, inter alia, that reliable signaling is enabled and the availability and reliability of the control apparatus 200 and simultaneously the safety of the user are improved.

Although FIG. 6 provides a second monitoring unit 20A, this is not absolutely necessary. The second monitoring unit 20A can perform the same functions as the first monitoring unit 10A and has a communication connection to the SECMU. Consequently, signaling remains possible even in the event of a major functional or technical fault. The monitoring unit 20A can, for example, instruct the SECMU to output a response signal 1B, 2B to an external unit.

Features of the present disclosure, in particular security devices 100, security units 10, 20, monitoring units 1A, 2A, security components 1, 2, warning signals 1D, 1E, 1F, 2D, 2E, 2F and response signals 1B, 1C, 2B, 2C, along with encrypted response signals, a decision unit 30, a symmetrical accelerator 34 and a key memory 35 can be implemented totally or partially as hardware or as software.

Where applicable, all individual features which are shown in the example embodiments can be combined or exchanged with one another without departing the scope of the invention.

REFERENCE NUMBER LIST

1 First security component
1A Second monitoring unit
1B Response signal
1B.1 Encryption unit
1B.2 Pad or pin
1C Response signal
1D Functional safety fault event
1E Security fault event
1F Security fault event
1.1A Monitoring unit
1.2 Subcomponent
1.2A Monitoring unit
1.3 Subcomponent
1.5 Subcomponent
1.5A Monitoring unit
2 Second security component
2A First monitoring unit
2B Response signal
2B.1 Encryption unit
2B.2 Pad or pin
2C Response signal
2D Functional safety fault event
2E Security fault event
2F Security fault event
2.1 Subcomponent
2.1A Monitoring unit
2.2 Subcomponent
2.2A Monitoring unit
2.4 Subcomponent
2.6 Subcomponent
2.6A Monitoring unit
3 Third security component
3B Response signal
3C Response signal
3D Functional safety fault event
4 Fourth security component
4B Response signal
4C Response signal
4D Functional safety fault event
10 First security unit (data security unit)
10A Monitoring unit of the first security unit
10B Warning signal of the first security unit
10C Warning signal of the first security unit
20 Second security unit (functional safety unit)
20A Monitoring unit of the second security unit
30 Satellite encryption unit
30A Data and control
31 Data sink or source
32 Communication connection
33 Decision unit
34 Symmetrical accelerator
35 Key memory with key
36 Pin
100 Security device
200 Control apparatus

What is claimed is:

1. A security hardware device configured to secure a control apparatus, the security hardware device comprising:
a data security domain;
a functional safety domain;
a data security processor provided in the data security domain and is configured to secure data from an unauthorized access or manipulation occurring during a debugging access of the control apparatus;
a functional safety processor provided in the functional safety domain and is configured to detect functional errors based on the unauthorized access or manipulation and generate respective safety alerts in response to detecting the functional errors; and
a monitoring processor configured to analyze the respective safety alerts generated by the functional safety processor for at least one pattern of safety alerts indicative of a security attack and generate a response signal in response to the respective safety alerts having at least one of the at least one pattern of safety alerts indicative of the security attack.

2. The security hardware device according to claim 1, wherein the monitoring processor is configured to analyze the respective safety alerts generated by the functional safety processor over a predetermined period of time for the at least one pattern of safety alerts indicative of the security attack.

3. The security hardware device according to claim 1, wherein:
the functional safety processor comprises two or more security hardware components configured to detect the functional errors corresponding to different hardware components of the control apparatus and generate the respective safety alerts, and
the monitoring processor is configured to analyze the respective safety alerts provided by the two or more security hardware components, in combination, for the at least one pattern of safety alerts indicative of the security attack.

4. The security hardware device according to claim 1, wherein the functional safety processor is configured to generate a respective safety alert, of the respective safety alerts, in response to detecting one or more functional errors.

5. The security hardware device according to claim 1, wherein the at least one pattern of safety alerts indicative of the security attack includes a reoccurring pattern of safety alerts, wherein the monitoring processor generates the response signal in response to detecting that the respective safety alerts occur in a reoccurring pattern in accordance with the reoccurring pattern of safety alerts.

6. The security hardware device according to claim 5, wherein the at least one pattern of safety alerts indicative of the security attack includes a simultaneous pattern of safety alerts, wherein the monitoring processor generates the response signal in response to detecting that the respective safety alerts occur simultaneously in accordance with the simultaneous pattern of safety alerts and in the reoccurring pattern in accordance with the reoccurring pattern of safety alerts.

7. The security hardware device according to claim 1, wherein the at least one pattern of safety alerts indicative of the security attack includes a simultaneous pattern of safety alerts, wherein the monitoring processor generates the response signal in response to detecting that the respective safety alerts occur simultaneously in accordance with the simultaneous pattern of safety alerts.

8. The security hardware device according to claim 1, wherein the functional safety processor comprises:
a first security hardware component configured to detect a first set of functional errors corresponding to a first set of components of the control apparatus and generate first safety alerts of the respective safety alerts in response to detecting the first set of functional errors; and
a second security hardware component configured to detect a second set of functional errors corresponding to a second set of components of the control apparatus and generate second safety alerts of the respective safety alerts in response to detecting the second set of functional errors,
wherein the monitoring processor is configured to analyze the first safety alerts and the second safety alerts, in combination, for the at least one pattern of safety alerts indicative of the security attack.

9. The security hardware device according to claim 8, wherein the first set of components are different from the second set of components.

10. The security hardware device according to claim 8, wherein the first security hardware component is configured to operate in a first operating mode and the second security hardware component is configured to operate in a high-availability mode, wherein the high-availability mode is available independently from the first operating mode.

11. The security hardware device according to claim 1, wherein the data security processor is configured to receive the response signal, and to output a further response signal indicative of a data surety fault in response to the response signal.

12. The security hardware device according to claim 11, wherein the data security processor comprises:
a first security hardware component configured to operate in a first operating mode; and
a second security hardware component configured to operate in a high-availability mode that is available independently from the first operating mode,
wherein the first security hardware component and the second security hardware component are configured to receive the response signal from the monitoring processor and output a further response signal allocated to a respective one of the first security hardware component and the second security hardware component on a basis of the received response signal.

13. The security hardware device according to claim 12, wherein the functional safety processor comprises:
a third security hardware component configured to detect a first set of functional errors corresponding to a first set of components of the control apparatus and generate first safety alerts of the respective safety alerts in response to detecting the first set of functional errors; and
a fourth security hardware component configured to detect a second set of functional errors corresponding to a second set of components of the control apparatus and generate second safety alerts of the respective safety alerts in response to detecting the second set of functional errors,
wherein the monitoring processor is configured to analyze the first safety alerts and the second safety alerts, in combination, for the at least one pattern of safety alerts indicative of the security attack.

14. The security hardware device according to claim 13, wherein the third security hardware component is configured to operate in the first operating mode and the fourth security hardware component is configured to operate in the high-availability mode.

15. The security hardware device according to claim 1, wherein:
the data security processor is configured to generate at least one warning signal and transmit the at least one warning signal to the functional safety processor,
the functional safety processor is configured to output a configurable response signal in response to receiving the at least one warning signal, and
wherein the functional safety processor is configured as a security management device and is configured to transmit security fault events of the functional safety processor as the configurable response signal selectively to the data security processor, wherein the data security processor is configured to output a further warning signal in response to receiving the configurable response signal.

16. The security hardware device according to claim 15, wherein:
the data security processor comprises:
a first security hardware component configured to operate in a first operating mode; and
a second security hardware component configured to operate in a high-availability mode that is available independently from the first operating mode,
the functional safety processor comprises:
a third security hardware component configured to operate in the first operating mode; and
a fourth security hardware component configured to operate in the high-availability mode,
a clock domain of the first security hardware component is different from a second clock domain of the second security hardware component,
a voltage domain of the third security hardware component is separated from a further voltage domain of the fourth security hardware component, and
the data security processor is configured to transmit the at least one warning signal from the data security processor to the third security hardware component or to the fourth security hardware component based on an operating mode selected from the first operating mode and the high-availability mode,
wherein respective one of the third security hardware component and the fourth security hardware component is configured to transmit the configurable response signal in response to receiving the at least one warning signal.

17. The security hardware device according to claim 15, wherein the functional safety processor has a communication connection to a monitoring circuitry of the data security processor, wherein the monitoring circuitry of the data security processor is configured to detect security fault events of the data security processor and transmit the security fault events to the functional safety processor, and wherein the monitoring circuitry of the data security processor is arranged in the functional safety domain.

18. The security hardware device according to claim 15, wherein the data security processor has a communication connection to a monitoring circuitry of the functional safety processor, wherein the monitoring circuitry for monitoring the functional safety processor is configured to detect security fault events of the functional safety processor and transmit the detected security fault events to the data security processor, and wherein the monitoring circuitry of the functional safety processor is arranged in the data security domain.

19. The security hardware device according to claim 16, further comprising:
   a second monitoring processor configured to operate in the high-availability mode, wherein the second monitoring processor is configured to detect a fault present in the third security hardware component and is arranged in the fourth security hardware component and has a communication connection to the fourth security hardware component, and wherein the fourth security hardware component is configured to output a third response signal if a fault is detected by the second monitoring processor; and
   a third monitoring processor configured to detect a fault present in the fourth security hardware component which has a communication connection to the third security hardware component.

20. The security hardware device according to claim 1, wherein the functional safety processor comprises:
   a first security hardware component configured to operate in a first operating mode; and
   a second security hardware component configured to operate in a high-availability mode, wherein the high-availability mode is available independently from the first operating mode;

wherein the security hardware device further comprises:
   a second monitoring processor arranged in the second security hardware component and has a communication connection to the second security hardware component, wherein the second monitoring processor is configured to operate in the high-availability mode and is configured to detect a fault present in the first security hardware component, the second security hardware component is configured to output a first response signal if a fault is detected by the second monitoring processor; and
   a third monitoring processor arranged in the first security hardware component and has a communication connection to the second security hardware component, wherein the third monitoring processor is configured to detect a fault present in the second security hardware component, wherein the first security hardware component is configured to output a second response signal if a fault is detected by the third monitoring processor.

21. The security hardware device according to claim 20, wherein:
   the first security hardware component is configured to detect a first set of functional errors corresponding to a first set of components of the control apparatus and generate first safety alerts of the respective safety alerts in response to detecting the first set of functional errors,
   the second security hardware component is configured to detect a second set of functional errors corresponding to a second set of components of the control apparatus and generate second safety alerts of the respective safety alerts in response to detecting the second set of functional errors, and
   the monitoring processor is configured to analyze the first safety alerts and the second safety alerts, in combination, for the at least one pattern of safety alerts indicative of the security attack.

* * * * *